United States Patent
Das

(10) Patent No.: US 10,445,247 B2
(45) Date of Patent: Oct. 15, 2019

(54) SWITCHING BETWEEN SINGLE-LEVEL AND TWO-LEVEL PAGE TABLE TRANSLATIONS

(71) Applicant: Red Hat, Inc., Raleigh, NC (US)

(72) Inventor: Bandan Souryakanta Das, Wakefield, MA (US)

(73) Assignee: Red Hat, Inc., Raleigh, NC (US)

( * ) Notice: Subject to any disclaimer, the term of this patent is extended or adjusted under 35 U.S.C. 154(b) by 101 days.

(21) Appl. No.: 15/628,079

(22) Filed: Jun. 20, 2017

(65) Prior Publication Data

US 2018/0365163 A1 Dec. 20, 2018

(51) Int. Cl.
*G06F 12/1027* (2016.01)
*G06F 9/30* (2018.01)
*G06F 9/455* (2018.01)

(52) U.S. Cl.
CPC ........ *G06F 12/1027* (2013.01); *G06F 9/3004* (2013.01); *G06F 9/45558* (2013.01); *G06F 2009/45583* (2013.01); *G06F 2212/651* (2013.01)

(58) Field of Classification Search
CPC .............. G06F 12/1027; G06F 9/3004; G06F 9/45558; G06F 2209/45583; G06F 2212/651
See application file for complete search history.

(56) References Cited

U.S. PATENT DOCUMENTS

| | | | |
|---|---|---|---|
| 8,959,577 B2 | 2/2015 | Epstein | |
| 9,086,981 B1* | 7/2015 | Tati | .......... G06F 12/10 |
| 9,229,881 B2 | 1/2016 | Epstein | |
| 9,256,552 B2 | 2/2016 | Epstein | |
| 9,501,637 B2 | 11/2016 | LeMay et al. | |
| 9,575,899 B2 | 2/2017 | Malyugin et al. | |
| 2007/0283125 A1* | 12/2007 | Manczak | ............ G06F 11/3466 711/207 |
| 2014/0053272 A1 | 2/2014 | Lukacs et al. | |
| 2015/0356023 A1 | 12/2015 | Peter et al. | |
| 2016/0378678 A1 | 2/2016 | LeMay et al. | |
| 2017/0371769 A1* | 12/2017 | Merten | ............... G06F 9/45558 |

OTHER PUBLICATIONS

Xiaolin Wang, Jiarui Zang, Zhenlin Wang, Yingwei Luo, Xiaoming Li, "Selective Hardware/Software Memory Virtualization", Dept. of Computer, Science and Technology, Peking University, Beijing, China, 100871; Dept. of Computer Science, Michigan Technological, University Houghton, MI 49931, USA, Mar. 9-11, 2011, http://www.cs.mtu.edu/~zlwang/papers/vee11.pdf.

Aristide Fattori, "*Hardware-Assisted Virtualization and its Applications to Systems Security*", University of Milan, Faculty of Mathematical, Physical and Natural Sciences, Department of Computer Science, Feb. 2014, http://joystick.artificialstudios.org/stuff/phd.pdf.

* cited by examiner

Primary Examiner — Hiep T Nguyen

(74) Attorney, Agent, or Firm — Haynes and Boone, LLP

(57) ABSTRACT

Methods, systems, and computer program products are included for switching from a first guest virtual address (GVA)-to-host physical address (HPA) translation mode to a second GVA-to-HPA translation mode. A method includes comparing, by a hypervisor, a number of translation lookaside buffer (TLB) misses to a miss threshold, the hypervisor being in a first GVA-to-HPA translation mode. The method includes switching from the first GVA-to-HPA translation mode to a second GVA-to-HPA translation mode if the number of TLB misses satisfies the miss threshold.

20 Claims, 6 Drawing Sheets

SWITCHING BETWEEN SINGLE-LEVEL AND TWO-LEVEL PAGE TABLE TRANSLATIONS

FIELD OF DISCLOSURE

The present disclosure generally relates to electrical computers and digital data processing, and more particularly to memory address translation.

BACKGROUND

A virtual machine is software that is executed on hardware to create a virtualization of a physical computer system. Virtual machines may function as self-contained platforms that run their own operating systems and software applications. A host machine may concurrently run one or more virtual machines using a hypervisor. The hypervisor allocates a certain amount of the host machine's resources, such as the host machine's underlying physical processors and memory devices, to each of the virtual machines. This allocation by the hypervisor allows guests of the virtual machines to transparently access the host machine's resources. Guest applications, including guest operating systems, may be executed on the allocated resources of each virtual machine. Local or remote clients may access these guest applications to perform computing tasks. In some instances, virtual machines and guest applications may be implemented to provide cloud computing environments.

Page tables may be used to translate from the guest-virtual memory space to the host-physical memory space address. The guest maintains a set of guest page tables in the guest memory, and each entry in a guest page table may map a location in the guest's guest-virtual memory space to a location in the guest's guest-physical memory space, which corresponds to the host physical memory on a native platform. Guest-physical memory is a guest's illusion of physical memory supported by the hypervisor, and refers to the memory that is visible to the guest running on the virtual machine and backed by the host-physical memory. Host-physical memory refers to the memory that is visible by the hypervisor as available on the system.

BRIEF SUMMARY

Methods, system, and techniques for switching from a first GVA-to HPA translation mode to another GVA-to-HPA translation mode are provided.

An example method of switching from a first GVA-to-HPA translation mode to a second GVA-to-HPA translation mode includes comparing, by a hypervisor, a number of translation lookaside buffer (TLB) misses to a miss threshold. The hypervisor is in a first GVA-to-HPA translation mode. The method includes switching from the first translation mode to a second GVA-to-HPA translation mode if the number of TLB misses satisfies the miss threshold.

An example system for switching from a first GVA-to-HPA translation mode to a second GVA-to-HPA translation mode includes a comparison module that compares a number of TLB misses to a miss threshold. A hypervisor is in a first GVA-to-HPA translation mode. The system also includes a switch module that switches from the first GVA-to-HPA translation mode to a second GVA-to-HPA translation mode if the number of TLB misses satisfies the miss threshold.

An example machine-readable medium includes a plurality of machine-readable instructions that when executed by one or more processors is adapted to cause the one or more processors to perform a method including: comparing, by a hypervisor, a number of TLB misses to a miss threshold, the hypervisor being in a first GVA-to-HPA translation mode; and switching from the first GVA-to-HPA translation mode to a second GVA-to-HPA translation mode if the number of TLB misses satisfies the miss threshold.

Figure 1:
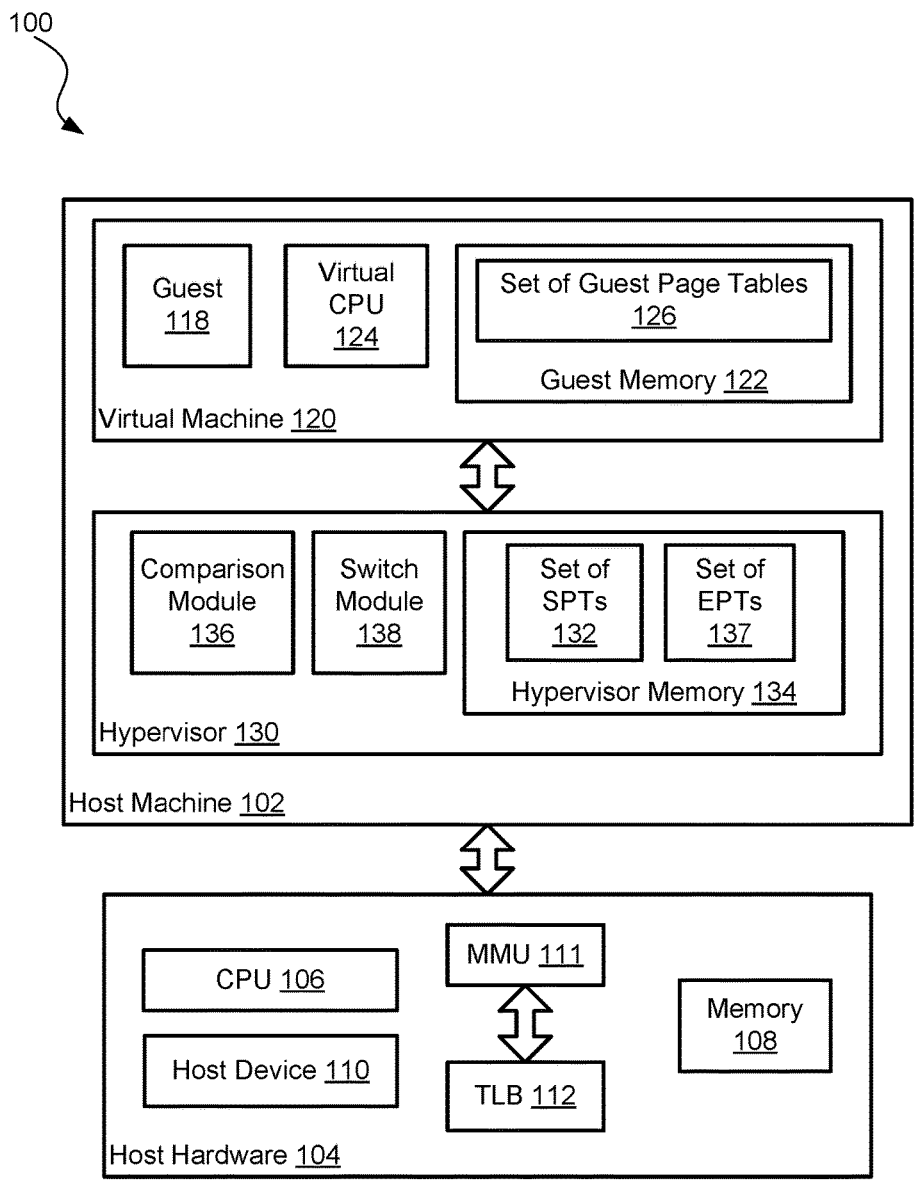
FIG. 1 is a block diagram illustrating a virtualized computing system that switches from a guest virtual address (GVA)-to-host physical address (HPA) translation mode to another GVA-to-HPA translation mode in accordance with various examples of the present disclosure.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

In a virtualization environment, a hypervisor and each guest running in a host machine may have and maintain its own set of page tables. Page tables may be used to translate from a guest virtual address (GVA) to a host physical address (HPA). An HPA is an address in host hardware located in memory. The guest maintains a set of guest page tables in the guest memory, and each entry in a guest page table may map a location in the guest's guest-virtual memory space to a location in the guest's guest-physical memory space, which corresponds to the host physical memory on a native platform. Guest-physical memory is a guest's illusion of physical memory supported by the hypervisor, and refers to the memory that is visible to the guest running on the virtual machine and backed by the host-physical memory. Host-physical memory refers to the memory that is visible by the hypervisor as available on the system.

A CPU may "walk" the page tables and translate a GVA to an HPA by traversing the guest page tables from the GVA and continuing into the host's page tables, until the HPA is found; this translation may be inserted into a translation lookaside buffer (TLB) to speed up future lookups. In some examples, a hypervisor may be in a shadow page table (SPT) translation mode. The hypervisor maintains its own set of SPTs, which include one or more host page tables, in the hypervisor memory. While the hypervisor is in the SPT translation mode, the hypervisor uses SPTs. For example, if the guest attempts to modify its set of guest page tables, the attempt traps into the hypervisor, which updates one or more SPTs. In some examples, the hypervisor write protects all of the guest's page tables.

Each page table entry in an SPT may map a GVA directly to its corresponding HPA. Rather than the hypervisor using the guest's page tables for memory translation, the hypervisor sets up its own SPTs that "shadow" the guest's attempted accesses. SPTs may be transparent to the guest. For example, the guest may believe that its guest page tables are being used for the address translations when in reality, the hypervisor is actually using its own SPTs for the address translations. While the hypervisor is in the SPT translation mode, the hypervisor performs one level of address translation, which is the translation from the GVA to the HPA specified in the SPTs.

While the CPU is in the guest mode, the guest may modify the data stored in the guest memory. Some workloads may result in a high number of page tables being modified and/or created. While the hypervisor is in the SPT translation mode, each time the guest attempts to modify its page tables, a virtual machine exit occurs and control of the CPU transfers from the guest to the hypervisor. As discussed, the hypervisor shadows the guest's attempted modifications using SPTs. If page tables are being created more often and exceed a fault threshold, the cost of virtual machine exits may exceed the benefit of using SPTs.

A solution to the problem of incurring a high number of the aforementioned virtual machine exits may include translating addresses using extended page tables (EPTs) rather than the SPTs. The hypervisor maintains its own set of EPTs, which include one or more host page tables, in the hypervisor memory. While the hypervisor is in the EPT translation mode, the hypervisor performs two levels of address translation, which include a first translation from the GVA to the corresponding guest physical address (GPA) specified in the guest page tables and then a second translation from the GPA to the corresponding HPA specified in the EPTs. Accordingly, under the EPT translation mode, the guest's GPA undergoes a further mapping to determine the address in physical memory of the host hardware. The guest may access and modify guest page tables for translation of GVAs to GPAs, and the hypervisor sets up and maintains new EPTs for translation of GPAs to HPAs. Accordingly, it becomes unnecessary for the hypervisor to "shadow" the guest page tables. Rather, the guest may load the memory management unit (MMU) with the guest's own translation page tables, and the hypervisor may sit between the guest-physical memory and the MMU. Additionally, the guest may manage its own page faults. Although the hypervisor uses two levels of translation while in the EPT translation mode, the system may perform better compared to when the hypervisor is in the SPT translation mode because address translations may be cached in the TLB. For address translations, most of the time and processing cycles are devoted to the first instance of actually performing the translation (e.g., walking the page tables). After that, however, the CPU may fetch the translation from the TLB, without performing the page table walk.

While the CPU is in the guest mode, the guest may modify the data stored in the guest memory. Some workloads may result in a high number of TLB misses. For example, if a memory intensive workload in the guest is thrashing the TLB often, the TLB entry for the two levels of translation (e.g., GVA to GPA, and GPA to HPA) would be invalidated in the TLB. When the guest changes its page tables, the guest invalidates the TLBs. TLB misses may also occur with memory-intensive performance-oriented workloads, which may fill up the TLB quickly and cause thrashing. Trashing may lead to more TLB misses and may happen with both shadow paging and EPT. With shadow paging, however, the CPU implements one-level of translation, resulting in potentially better performance than the use of EPTs.

Each time a TLB miss occurs, the CPU performs the page table walk for these two levels of translation. If the number of TLB misses exceeds a miss threshold, this may indicate that the EPTs are being modified frequently. In particular, the translation time may be significant because the page table walks are happening more often. Accordingly, if the hypervisor is in the EPT translation mode and a threshold number of TLB misses occurs within a particular time period, it may be desirable for the hypervisor to be in the SPT translation mode. Although page tables are being created again and again while the hypervisor is in the SPT translation mode, the translation includes only one level of translation (GVA to HPA), possibly resulting in improved system performance.

Additionally, although with SPTs, the GVA-to-HPA translation may be cached, each time the guest touches its page tables, a virtual machine exit occurs because they are write protected by the hypervisor to update the SPTs. With EPT, however, the guest changing its page tables typically may not cause a virtual machine exit. For example, the guest can switch from entry 0 to 1 in the page table for a translation, which does not cause a virtual machine exit because the table itself already has been mapped from the GPA to HPA in the EPT. If the guest decides to point to a different page table in its address space and that page does not have an associated list of EPT tables, then an exit occurs to the hypervisor to create new EPT mappings.

The present disclosure provides techniques to leverage the benefits of using both SPTs and EPTs, while mitigating their shortcomings. In some examples, the hypervisor may be in one of a plurality of GVA-to-HPA translation modes and may switch between translation modes in order to optimize performance. In some examples, a first GVA-to-HPA translation mode is an SPT translation mode that uses SPTs, and a second GVA-to-HPA translation mode is an EPT translation mode that uses the set of guest page tables and the hypervisor's EPTs. In an example, if the hypervisor is in the EPT translation mode and the number of TLB misses exceeds a miss threshold, the hypervisor may switch from the EPT translation mode to the SPT translation mode. If the hypervisor is in the SPT translation mode and the number of virtual machine exits (or the number of page faults) caused by guest modification to page tables exceeds a fault threshold, the hypervisor may switch from the SPT translation mode to the EPT translation mode.

These techniques are beneficial and advantageous for improving processing efficiency and performance while at the same time improving memory usage. Of course, it is understood that these features and advantages are shared among the various examples herein and that no one feature or advantage is required for any particular example.

II. System Architecture

FIG. 1 is a block diagram illustrating a virtualized computing system 100 that switches from a first GVA-to-HPA translation mode to a second GVA-to-HPA translation mode in accordance with various examples of the present disclosure. The system 100 includes a host machine 102. The host machine 102 may include a personal computer (PC), tablet PC, rack mount computer, cellular telephone, web appliance, server, network router, switch or bridge, or any machine capable of executing a set of instructions (sequential or otherwise) that specify actions to be taken by that machine. Further, while a single host machine is illustrated, the term "machine" shall also be taken to include any collection of machines that individually or jointly execute a set (or multiple sets) of instructions to perform any one or more of the methodologies discussed herein. For example, a collection of machines may be communicatively coupled via one or more network devices and/or transport media.

The host machine 102 is coupled to host hardware 104. The host hardware 104 includes physical elements such as a central processing unit (CPU) 106, a memory 108, a host device 110, a memory management unit (MMU), and a translation lookaside buffer (TLB) 112. While one of each of these elements is illustrated for the purposes of simplicity, in some examples one or more of these hardware elements may be included in the host hardware 104. For example, the host hardware 104 may include a plurality of CPUs 106 as well as various types of memory, host devices, and caches (e.g., TLB 112).

A "CPU" may also be referred to as a "physical processor" or a "processor" herein. A CPU shall refer to a device capable of executing instructions encoding arithmetic, logical, or input/output (I/O) operations. In one illustrative example, a CPU may follow the Von Neumann architectural model and may include an arithmetic logic unit (ALU), a control unit, and a plurality of registers. In a further aspect, a CPU may be a single-core processor that is typically capable of executing one instruction at a time (or process a single pipeline of instructions), or a multi-core processor that may simultaneously execute multiple instructions. In another aspect, a processor may be implemented as a single-integrated circuit, two or more integrated circuits, or may be a component of a multi-chip module (e.g., in which individual microprocessor dies are included in a single integrated circuit package and hence share a single socket).

In the present example, the CPU 106 is structured to include one or more general-purpose processing devices such as a microprocessor, CPU core, and the like. More particularly, the CPU 106 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the CPU 106 is structured to include one or more special-purpose processing devices such as an application specific integrated circuit (ASIC), a field programmable gate array (FPGA), a digital signal processor (DSP), network processor, and so forth. The CPU 106 executes instructions for performing the operations, steps, and actions discussed herein.

The CPU 106 includes a set of registers. A register provides a fast mechanism for the CPU 106 to access data. One or more registers may be, for example, a data register that stores a numeric value (e.g., integer), address register that stores memory addresses that are used by instructions that indirectly access working memory, a general-purpose register that can store both data and memory addresses, floating-point register that stores a floating point number, constant register that stores a read-only value, vector register that stores data for vector processing done by Single Instruction, Multiple Data (SIMD), or special-purpose register that stores program state.

"Memory" herein shall refer to volatile or non-volatile memory, such as random access memory (RAM), read-only memory (ROM), electrically erasable ROM (EEPROM), or any other memory capable of storing data. In the present example, the memory 108 may include random access memory (RAM), and the MMU 11 may divide the RAM into pages. A page is a contiguous section of memory of a set size that is handled by the MMU 111 as a single entity. The guest-virtual memory refers to a continuous virtual address space presented by the guest 118 to one or more applications. The guest 118 may present a virtual address space to the applications running on the guest 118. The guest-virtual memory is visible to the applications running inside the virtual machine 120. The guest virtual addresses (GVAs) may be mapped to physical memory addresses using one or more data structures (e.g., a page table).

Additionally, the memory 108 is structured to include at least one computer-readable storage medium on which is stored one or more sets of instructions (e.g., software) embodying any one or more of the methodologies or functions described herein. The memory 108 may be structured to include one or more of a read-only memory (ROM), flash memory, dynamic random access memory (DRAM) (e.g., a synchronous DRAM (SDRAM), double data rate (DDR SDRAM), or DRAM (RDRAM), and so forth), static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in a non-transitory computer-readable medium that are executable by the CPU 106.

In the present example, the host device 110 is structured to include at least one hardware device, such as a network interface card, wireless adapter card, audio/sound card, graphics card, storage adapter, or other hardware device. In some examples, these hardware devices are coupled to a PCI bus provided by the host hardware 104. In other examples, hardware devices are integrated into a motherboard provided by the host hardware 104. The CPU 106, the memory 108, and the host device 110 hardware elements of the host hardware 104 may be communicatively coupled via one or more buses. The host hardware 104 also may include other hardware elements, such as a video display unit (e.g., a liquid crystal display (LCD) monitor), alphanumeric input device (e.g., a keyboard), and a cursor control device (e.g., a mouse).

The MMU 111 supports the use of virtual memory. With MMU 111, memory addresses may go through a translation step from a virtual address to a physical address prior to each memory access. In a virtual memory system, the addresses seen by user programs do not directly correspond to the physical addresses used by the hardware. A TLB 112 is a memory cache that stores recent translations of virtual memory to physical memory addresses for faster retrieval.

The host machine 102 includes a virtual machine 120 and a hypervisor 130, which also may be referred to as a virtual machine monitor, virtual machine manager, and/or VMM. The CPU 106 may be in one of a plurality of modes. In an example, the guest 118 may use a separate mode of execution called the guest mode. On certain events, the CPU 106 exits out of guest mode and enters a root mode. The hypervisor 130 executes in the root mode, which is a more privileged mode than the guest mode. The hypervisor 130 may include executable instructions that are stored in the memory 108 and executed by the CPU 106 to provide one or more virtual machines (e.g., virtual machine 120). In some examples, the hypervisor 130 is run on top of a host operating system and host kernel. In other examples, the hypervisor 130 is run directly on the host hardware 104 without the use of a host operating system. The hypervisor 130 may provide the virtual machine 120 by performing a hardware emulation, full virtualization, para-virtualization, and/or operating system-level virtualization corresponding to the host machine 102. In some examples, the hypervisor 130 is structured to rely upon, use, or include features provided by a kernel and/or operating system running on the host machine 102.

The hypervisor 130 manages system resources, including providing access of guests (e.g., guest applications such as operating systems, kernels, user applications, and so forth) of the virtual machine 120 to the host hardware 104, such as the CPU 106, the memory 108, and the host device 110. The hypervisor 130 is structured to provide the virtual machine 120 by virtualizing at least a portion of the host hardware 104. In an example, the system resources that are provided to the guests of the virtual machine 120 include a virtual CPU 124 that is mapped to the CPU 106 and the guest memory 122 that is mapped to at least a portion of the memory 108. Although one virtual machine is illustrated as running on the host machine 102, other examples including more than one virtual machine are within the scope of the present disclosure.

In the present example, the virtual machine 120 includes a guest kernel/operating system (OS) 118, which may also be referred to as a guest 118. The guest 118 may be structured to include a kernel as well as an operating system that runs on top of the kernel. In other examples, the guest 118 may include a stand-alone kernel that does not have an operating system running on top of the kernel. The hypervisor 130 may allow multiple operating systems, called guests, to run on the same physical system by offering virtualized hardware to the guests. The host machine 102 may run multiple operating systems, concurrently and in isolation from other programs on a single system. The guest 118 may include, for example, RED HAT® ENTERPRISE LINUX®, FEDORA®, WINDOWS®, OS X, IOS, ANDROID®, or other operating system. Trademarks are the property of their respective owners. A virtual machine may include a guest that executes a device driver (not shown) that communicates with the hardware devices.

The guest 118 provides core computing functionality to the virtual machine 120. For example, a kernel manages important tasks of the virtual machine 120, such as allocating memory pages of the guest memory 122 to virtual machine processes and/or threads, communicating I/O to and from a virtual device, managing a file system, handling interrupts, scheduling and running processes to execute instructions of computing tasks by the virtual CPU 124, providing an interface between devices and software applications, and/or providing other important computing features. In the present example, the virtual CPU 124 includes one or more CPUs that may be accessed by processes running on the virtual machine 120 to pass instructions to the CPU 106 for execution. These instructions may include executable instructions stored on memory pages in the guest memory 122. For example, executable instructions may correspond to instructions of executable (binary) files and/or libraries that are executed to perform actions on the virtual machine 120.

The hypervisor 130 allocates the guest memory 122 to the virtual machine 120. In the present example, the guest memory 122 includes a portion of the memory 108. The guest memory 122 may include one or more ranges of memory pages that are mapped to the memory 108, such that processes running on the virtual machine 120 may access the memory 108 by accessing the guest memory 122. These ranges of memory pages may include one or more consecutive and/or non-consecutive memory ranges. Each range may include one or more memory pages. The mapping between the memory pages of the guest memory 122 and the memory pages of the memory 108 may be provided by one or more page tables of the hypervisor 130 and/or the guest 118.

The hypervisor 130 includes a comparison module 136 and a switch module 138 that may be used to switch from a current GVA-to-HPA translation mode to a different GVA-to-HPA translation mode in order to optimize performance. The present disclosure leverages on benefits of both the SPT and EPT translation modes. In some examples, a first GVA-to-HPA translation mode is an SPT translation mode that uses SPTs, and a second GVA-to-HPA translation mode is an EPT translation mode that uses the set of guest page tables and the hypervisor's EPTs. The set of guest page tables 126 is stored in the guest memory 122. Each of the set of SPTs 132 and the set of EPTs 137 includes one or more host page tables and both are stored in the hypervisor memory 134.

Figure 2:
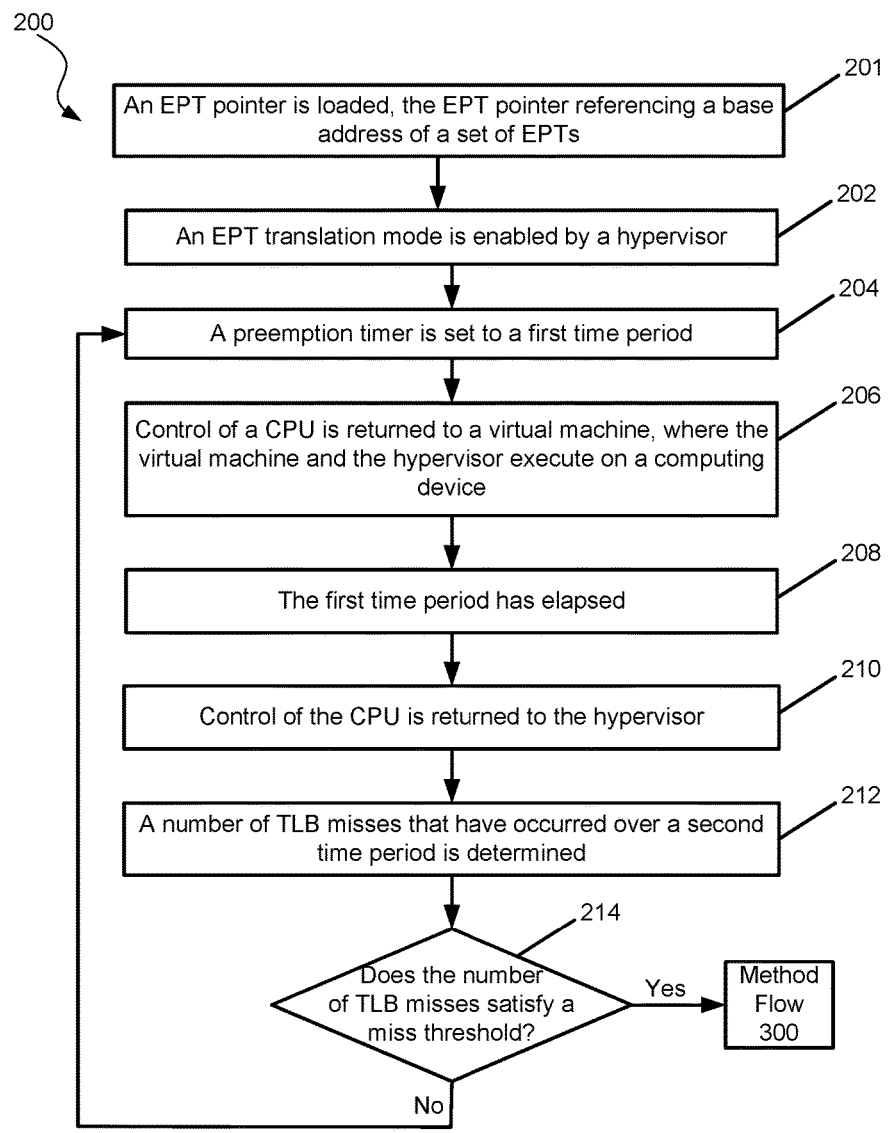
FIG. 2 is an example flowchart illustrating a method of switching from the EPT translation mode to the SPT translation mode in accordance with various examples of the present disclosure.

FIG. 2 is an example flowchart illustrating a method 200 of switching from the EPT translation mode to the SPT translation mode in accordance with various examples of the present disclosure. Method 200 is not meant to be limiting and may be used in other applications. Method 200 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 200 is performed by the system 100 illustrated in FIG. 1. For example, method 200 may be performed on the host machine 102. In some examples, the order of the actions described below may also be performed according to alternative orderings. In yet other examples, additional actions may be added and actions that are described may be removed.

At action 201, an EPT pointer is loaded, the EPT pointer referencing a base address of the set of EPTs 137. In an example, the switch module 138 loads and restores the EPT pointer in a data structure in memory or to the virtual machine control structure (VMCS).

At action 202, an EPT translation mode is enabled by a hypervisor. In some examples, switch module 138 loads the EPT pointer and enables the ETP translation mode by default when the hypervisor 130 prepares the CPU 106 to run in guest mode. In an example, the switch module 138 maintains its own separate variable representing the EPT translation mode and updates it accordingly. For example, if the variable is set to a first value the hypervisor 130 is in the EPT translation mode, and if the variable is set to a second value the hypervisor 130 is not in the EPT translation mode. In some examples, the switch module 138 enables the EPT translation mode by enabling an "EPT bit" in a control register of the CPU 106. The switch module 138 may write a particular value to the control register to enable or disable the EPT translation mode. In an example, the register is a model-specific register (MSR). For example, if the switch module 138 sets a bit in the MSR, the hypervisor 130 is in the EPT translation mode, and if the switch module 138 clears the bit in the MSR, the hypervisor 130 is not in the EPT translation mode.

At action 204, a preemption timer is set to a first time period. When the first time period elapses, the CPU 106 exits the guest mode and enters the root mode, at which point control of the CPU is transferred to the hypervisor 130. In an example, the preemption timer is set up within the hypervisor 130, which may be provided by the host hardware 104. In an example, the comparison module 136 sets the preemption timer to 10 milliseconds (ms).

After action 204, process flow proceeds to action 206, where control of a CPU is returned to a virtual machine, where the virtual machine and the hypervisor execute on a computing device. In an example, the hypervisor 130 returns control of the CPU 106 to the virtual machine 120, where the virtual machine 120 and the hypervisor 130 execute on the host machine 102. While the hypervisor 130 is in the EPT translation mode, the guest 118 executes instructions and modifies data. The set of guest page tables 126 is used to translate from a GVA to the corresponding GPA, and the set of EPTs 137 is used to translate from the GPA to the corresponding HPA.

At action 208, the first time period has elapsed. In an example, the first time period is 10 ms. At action 210, control of the CPU is returned to the hypervisor. When the CPU 106 is running in the guest mode (see action 206), the CPU 106 is running in a less privileged state that is set up by the hypervisor 130 so that the guest 118 can run. While in the guest mode, the CPU 106 does not have access to the number of TLB 112 misses that have occurred. The number of TLB misses that have occurred over a time period is "privileged" information and may be determined if the CPU 106 is in the root mode. The preemption timer provides a mechanism for exiting the virtual machine and transferring control of the CPU 106 to the hypervisor 130, and thus determining the number of TLB misses that have occurred over the second time period. It is desirable to check the number of TLB misses that have occurred in order to intelligently determine whether it is desirable for the hypervisor 130 to remain in the EPT translation mode or to switch to the SPT translation mode. Accordingly, to determine the number of TLB misses, control of the CPU 106 is transferred to the hypervisor 130.

At action 212, a number of TLB misses that have occurred over a second time period is determined. In an example, the comparison module 136 determines the number of TLB miss that have occurred over the second time period (e.g., 100 misses per ms) by reading a register of the CPU 106. The second time period is configurable, and may be the same as or different from the first time period. The first and second time periods may be configurable by an administrator. The comparison module 136 may calculate an average value of the number of TLB misses that have occurred. In keeping with the above example in which the first time period is 10 ms, every 10 ms the comparison module 136 samples a performance counter representing the number of TLB misses that have occurred over a particular time period. In particular, the CPU 106 exits out of the guest 118 and control of the CPU 106 is transferred back to the hypervisor 130, which reads the number of TLB misses from, for example, a register of the CPU 106.

It should be understood that other mechanisms may be provided for exiting the virtual machine and transferring control of the CPU 106 to the hypervisor 130 so that the hypervisor 130 may determine the number of TLB misses that have occurred. In an example, if an interrupt occurs while the guest 118 is running, control of the CPU 106 may transfer from the guest 118 back to the hypervisor 130, which may then determine the number of TLB misses that have occurred over the second time period.

At action 214, it is determined whether the number of TLB misses satisfies a miss threshold. If not, the process flow proceeds from action 214 to action 204, in which the preemption timer is set again to the first time period. If so, the process flow proceeds from action 214 to method 300 shown in FIG. 3. In an example, the number of TLB misses satisfies the miss threshold if the number of TLB misses is greater than the miss threshold. The miss threshold is configurable. In an example, the miss threshold is 50 TLB misses. If the number of TLB misses satisfies the miss threshold, it may be desirable for the switch module 138 to switch the hypervisor 130 from the EPT translation mode to the SPT translation mode because modification to the set of EPTs 137 is happening frequently.

It is understood that additional processes may be performed before, during, or after actions 202-214 discussed above. It is also understood that one or more of the actions of the method 200 described herein may be omitted, combined, or performed in a different sequence as desired.

Figure 3:
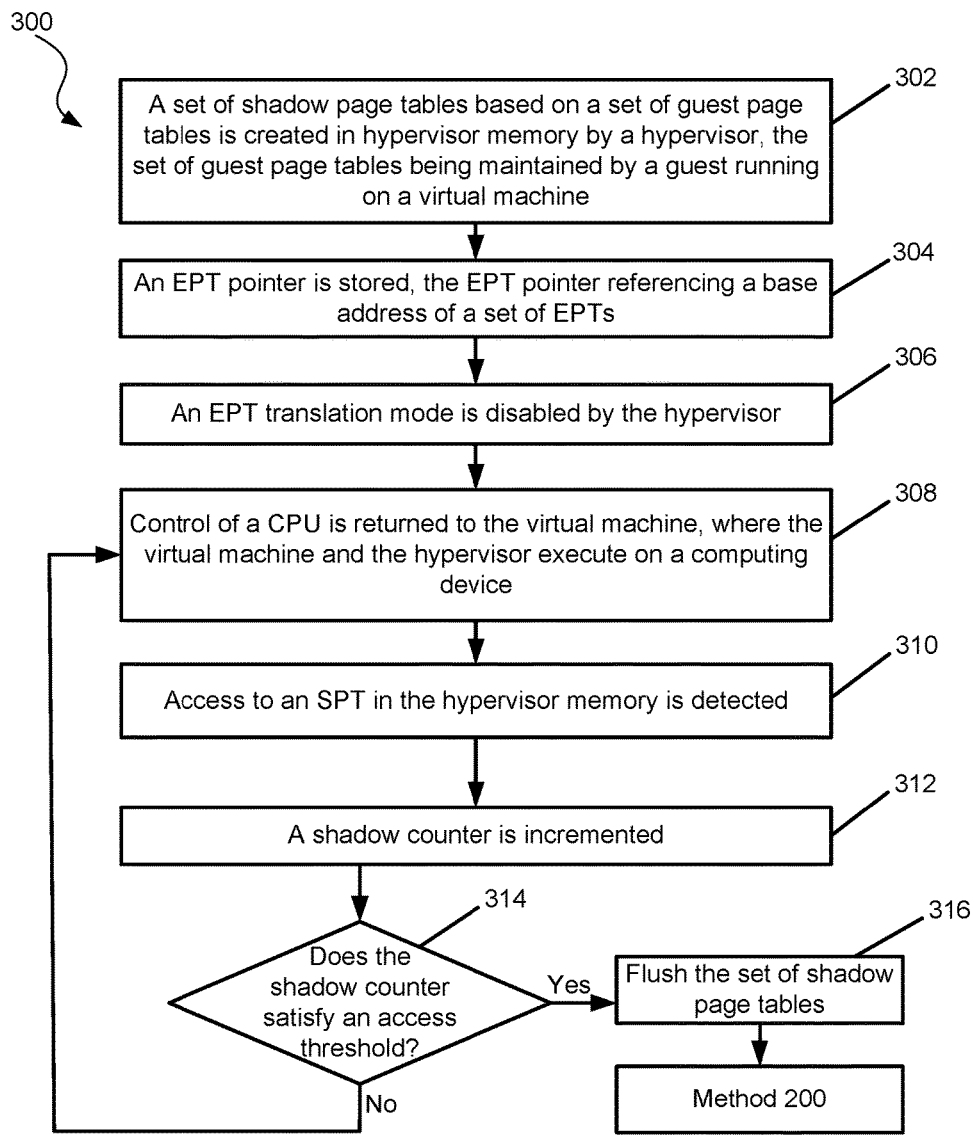
FIG. 3 is an example flowchart illustrating a method of switching from the SPT translation mode to the EPT translation mode in accordance with various examples of the present disclosure.

FIG. 3 is an example flowchart illustrating a method 300 of switching from the SPT translation mode to the EPT translation mode in accordance with various examples of the present disclosure. Method 300 is not meant to be limiting and may be used in other applications. Method 300 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 300 is performed by the system 100 illustrated in FIG. 1. For example, method 300 may be performed on host machine 102. In some examples, the order of the actions described below may also be performed according to alternative orderings. In yet other examples, additional actions may be added and actions that are described may be removed.

At action 302, a set of SPTs based on a set of guest page tables is created in hypervisor memory by a hypervisor, the set of guest page tables being maintained by a guest running on a virtual machine. In an example, the switch module 138 creates in the hypervisor memory 134 the set of SPTs 132 based on the set of guest page tables 126, where the set of guest page tables 126 is maintained by the guest 118 running on the virtual machine 120. The hypervisor 130 allocated to and has access to the address space of the guest. In an example, the hypervisor 130 walks inside the guest address space starting from the GVAs to the GPAs through the set of guest page tables that the guest has maintained itself. The hypervisor 130 may create the set of SPTs 132 by traversing the guest address space and in particular the set of guest page tables 126 and identify corresponding page tables in the hypervisor 130's own address space.

While the hypervisor 130 is in the EPT mode, the set of guest page tables 126 are used for translation from a GVA to a GPA. In contrast, while the hypervisor 130 is in the SPT mode, the set of guest page tables 126 are not page tables that are used for address translation. Accordingly, the next time an address translation occurs while the hypervisor 130 is in the SPT translation mode, rather than use the set of guest page tables 126 that may translate from a GVA to a GPA, the hypervisor 130 uses the GVA to HPA mapping specified in the set of SPTs 132. Additionally, the hypervisor 130 accesses and/or modifies the set of SPTs 132 based on attempts by the guest 118 to access and/or modify its set of guest page tables 126.

At action 304, an EPT pointer is stored, the EPT pointer referencing a base address of a set of EPTs. In an example, the switch module 138 stores the EPT pointer in a data structure or a register of the CPU 106. At action 306, an EPT translation mode is disabled by the hypervisor. In an example, the switch module 138 disables the EPT translation mode. If the switch module 138 disables the EPT translation mode, this may cause the hypervisor 130 to switch from the EPT translation mode to the SPT translation mode. When the switch module 138 disables the EPT translation mode, the set of EPTs 137 is not changed and is kept intact for future use. If the switch module 138 switches back to the EPT translation mode at a later point in time, the hypervisor 130 may easily switch back to using the set of EPTs 137 by restoring the EPT pointer to the VMCS.

At action 308, control of a CPU is returned to the virtual machine, where the virtual machine and the hypervisor execute on a computing device. In an example, the hypervisor 130 returns control of the CPU 106 to the virtual machine 120, where the virtual machine 120 and the hypervisor 130 execute on the host machine 102. While the hypervisor 130 is in the SPT translation mode, the guest 118 executes instructions and modifies data, and the hypervisor 130 uses the set of SPTs 132 to translate from GVAs to their corresponding HPAs. If the guest 118 attempts to modify the data stored in the set of guest page tables 126, those attempts are trapped back to the hypervisor 130 so that the hypervisor 130 can access and/or modify the set of SPTs 132 in accordance with the guest 118's attempt.

At action 310, access to an SPT in the hypervisor memory is detected. In an example, the comparison module 136 detects an access to the set of SPTs 132. While the hypervisor 130 is in the SPT translation mode, each time the guest 118 attempts to modify its page tables, a virtual machine exit occurs and control of the CPU 106 transfers from the guest to the hypervisor 130. The hypervisor 130 accesses the set of SPTs 132.

At action 312, a shadow counter is incremented. In an example, the comparison module 136 increments a shadow counter that represents the number of accesses to the set of SPTs 132. The hypervisor 130 maintains the set of SPTs 132 for the guest 118. The comparison module 136 is aware of each attempted modification to the set of guest page tables 126 because each time the guest 118 accesses the set of guest page tables 126, the access is trapped back to the hypervisor 130. The hypervisor 130 modifies the set of shadow page tables 132 accordingly. While the hypervisor 130 is in the SPT mode, the set of EPTs 137 is still intact in the hypervisor memory 134.

At action 314, it is determined whether the shadow counter satisfies an access threshold. If not, the process flow proceeds from action 314 to action 308. If so, the process flow proceeds from action 314 to action 316. The access threshold may be configurable. At action 316, the set of SPTs 132 is flushed. In an example, the switch module 138 flushes the set of SPTs 132. Accordingly, the next time the hypervisor 130 switches from the EPT translation mode to the SPT translation mode, the hypervisor 130 will recreate the SPTs. After action 316, process flow proceeds from action 316 to method 200 shown in FIG. 2.

It is understood that additional processes may be performed before, during, or after actions 302-318 discussed above. It is also understood that one or more of the actions of the method 300 described herein may be omitted, combined, or performed in a different sequence as desired. For example, if it is determined that the shadow counter satisfies the access threshold (see action 314), the comparison module 136 may set the shadow counter to zero. Accordingly, the next time the hypervisor 130 switches from the EPT translation mode to the SPT translation mode, the number of accesses to the set of SPTs may be detected anew.

Figure 4:
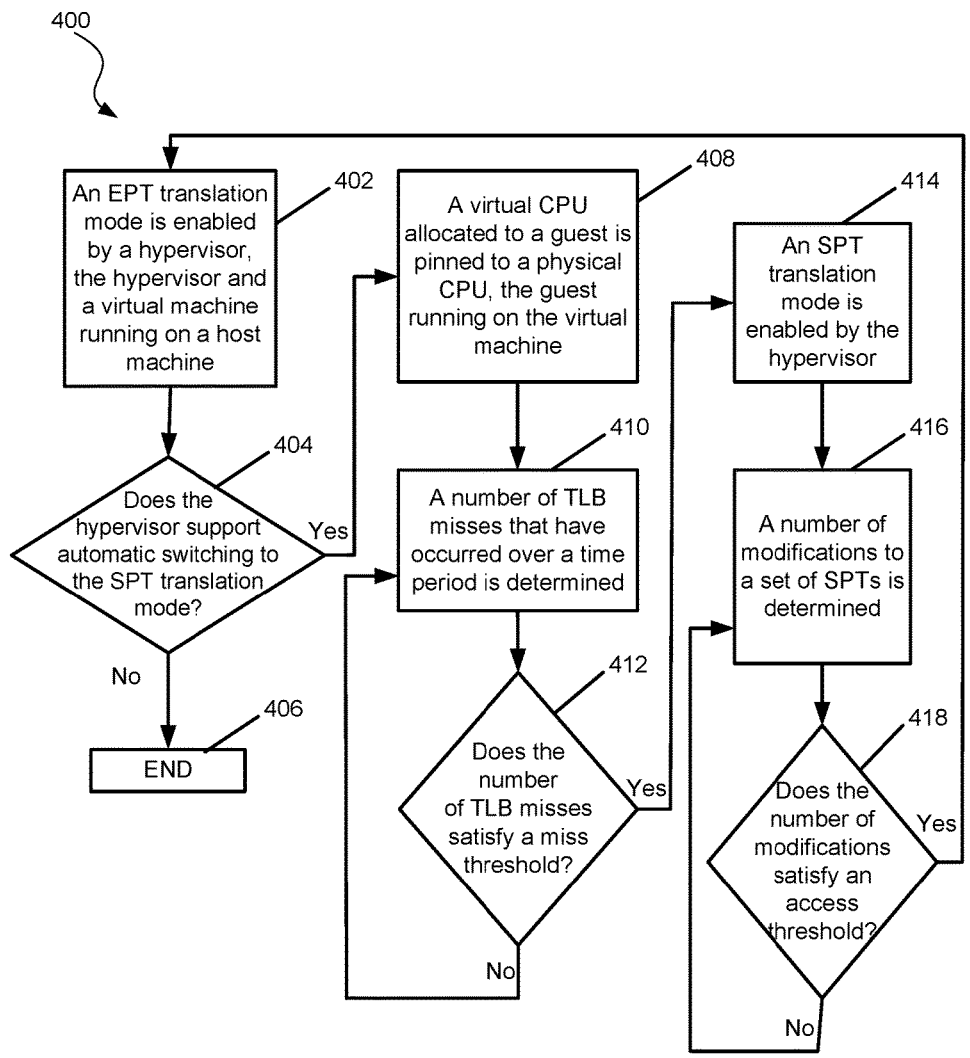
FIG. 4 is an example flowchart illustrating a method of switching between the SPT and EPT translation modes in accordance with various examples of the present disclosure.

The hypervisor 130 may switch back and forth between the EPT and SPT translation modes multiple times, depending on the guest workload. FIG. 4 is an example flowchart illustrating a method 400 of switching between the SPT and EPT translation modes in accordance with various examples of the present disclosure. Method 400 is not meant to be limiting and may be used in other applications. Method 400 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 300 is performed by the system 100 illustrated in FIG. 1. For example, method 300 may be performed on host machine 102. In some examples, the order of the actions described below may also be performed according to alternative orderings. In yet other examples, additional actions may be added and actions that are described may be removed.

At action 402, an EPT translation mode is enabled by a hypervisor, the hypervisor and a virtual machine running on a host machine. In an example, the switch module 138 enables the EPT translation mode, the hypervisor 130 and the virtual machine 120 running on the host machine 102. In some examples, the switch module 138 enables the EPT translation mode by default when the hypervisor 130 prepares the CPU 106 to run in guest mode. The switch module 138 may enable the EPT translation mode by loading the EPT pointer.

At action 404, it is determined whether the hypervisor supports automatic switching to the SPT translation mode. Some hypervisors may or may not have the features available to support automatic switching to the SPT translation mode. In an example, the hypervisor may support switching to the SPT translation mode if the CPU has support for the TLB miss events and is able to read the performance counter representing the number of TLB misses. If the CPU does not have support for reading such performance counter, the hypervisor does not have support for switching to the SPT translation mode. In an example, the switch module 138 determines whether the hypervisor 130 supports switching from the EPT translation mode to the SPT translation mode. If not, process flow proceeds from action 404 to action 406, which ends the flow. In this situation, the hypervisor does not go through the decision making process of whether to switch from the EPT translation mode to the SPT translation mode and may maintain the EPT translation mode.

In contrast, if the hypervisor 130 supports automatic switching to the SPT translation mode, process flow proceeds from action 404 to action 408. At action 408, a virtual CPU allocated to a guest is pinned to a physical CPU, the guest running on the virtual machine. In an example, the switch module 138 pins the virtual CPU 124 to the physical CPU 106. Accordingly, the address space for the virtual CPU 124 does not jump to a different process and the guest continues to execute on the same physical CPU. In this way, the hypervisor 130 knows that the TLB misses correspond to the guest 118, and not to the host or another guest running on the host machine 102.

At action 410, a number of TLB misses that have occurred over a time period is determined. In an example, the comparison module 136 determines the number of TLB misses that have occurred over the time period. At action 412, it is determined whether the number of TLB misses satisfies a miss threshold. In an example, the comparison module 136 determines whether the number of TLB misses satisfies the miss threshold. In an example, the number of TLB misses satisfies the miss threshold if the number of TLB 112 misses is greater than or not less than the miss threshold.

If the number of TLB misses does not satisfy the miss threshold, process flow proceeds from action 412 to action 410. If the number of TLB misses satisfies the miss threshold, process flow proceeds from action 412 to action 414, in which an SPT translation mode is enabled by the hypervisor. In some examples, the switch module 138 enables the EPT translation mode by writing a first value to a register of the CPU 106 and enables the SPT translation mode by writing a second value to the register.

At action 416, a number of modifications to a set of SPTs 132 is determined. In an example, the comparison module 136 determines the number of modifications to the set of SPTs 132. While the hypervisor 130 is in the SPT translation mode, each attempted access by the guest to the guest page tables is trapped into the hypervisor 130, which maintains the set of SPTs 132. The set of SPTs 132 "shadow" the guest's attempted accesses. Accordingly, the comparison module 136 is able to keep track of and determine the number of modifications to the set of SPTs 132.

At action 418, it is determined whether the number of modifications satisfies an access threshold. In an example, the comparison module 136 determines whether the number of modifications satisfies the access threshold. The access threshold may be configurable by an administrator. If the number of modifications does not satisfy the access threshold, process flow proceeds from action 418 to action 416. In this situation, it may be more beneficial to remain in the SPT translation mode (and not switch to the EPT translation mode) because the guest 118 is not accessing its guest page tables enough (and thus the number of virtual machine exits is low) to cause the system to slow down. In contrast, if the number of modifications satisfies the access threshold, process flow proceeds from action 418 to action 402, at which the EPT translation mode is enabled. In this situation, it may be more beneficial to switch to the EPT translation mode because the number of virtual machine exits becomes high, and the cost of using the SPTs is outweighed by the system slow down.

It is understood that additional processes may be performed before, during, or after actions 402-418 discussed above. It is also understood that one or more of the actions of the method 400 described herein may be omitted, combined, or performed in a different sequence as desired.

Figure 5:
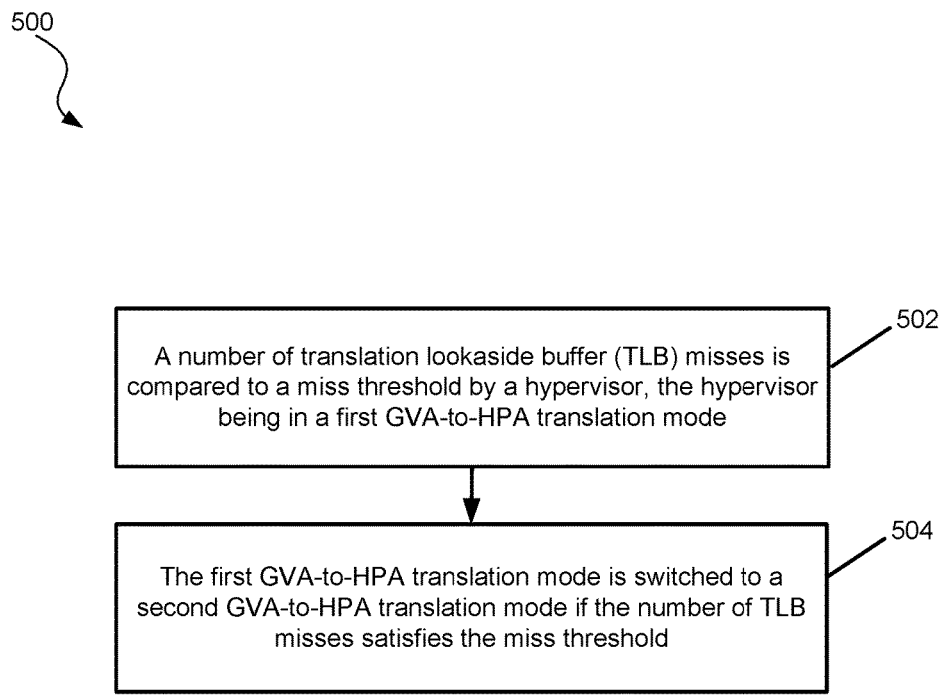
FIG. 5 is an example flowchart illustrating a method of switching from the EPT translation mode to the SPT translation mode in accordance with various examples of the present disclosure.

FIG. 5 is an example flowchart illustrating a method 500 of switching from the EPT translation mode to the SPT translation mode in accordance with various examples of the present disclosure. Method 500 is not meant to be limiting and may be used in other applications. Method 500 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 500 is performed by the system 100 illustrated in FIG. 1. For example, method 500 may be performed on the host machine 102. In some examples, the order of the actions described below may also be performed according to alternative orderings. In yet other examples, additional actions may be added and actions that are described may be removed.

At action 502, a number of TLB misses is compared to a miss threshold by a hypervisor, the hypervisor being in a first GVA-to-HPA translation mode. In an example, the comparison module 136 compares a number of TLB misses to a miss threshold, where the hypervisor 130 is in a first GVA-to-HPA translation mode. At action 504, the first translation GVA-to-HPA mode is switched to a second GVA-to-HPA translation mode if the number of TLB misses satisfies the miss threshold. In an example, the switch module 132 switches from the first GVA-to-HPA translation mode to a second GVA-to-HPA translation mode if the number of TLB misses satisfies the miss threshold.

Figure 6:
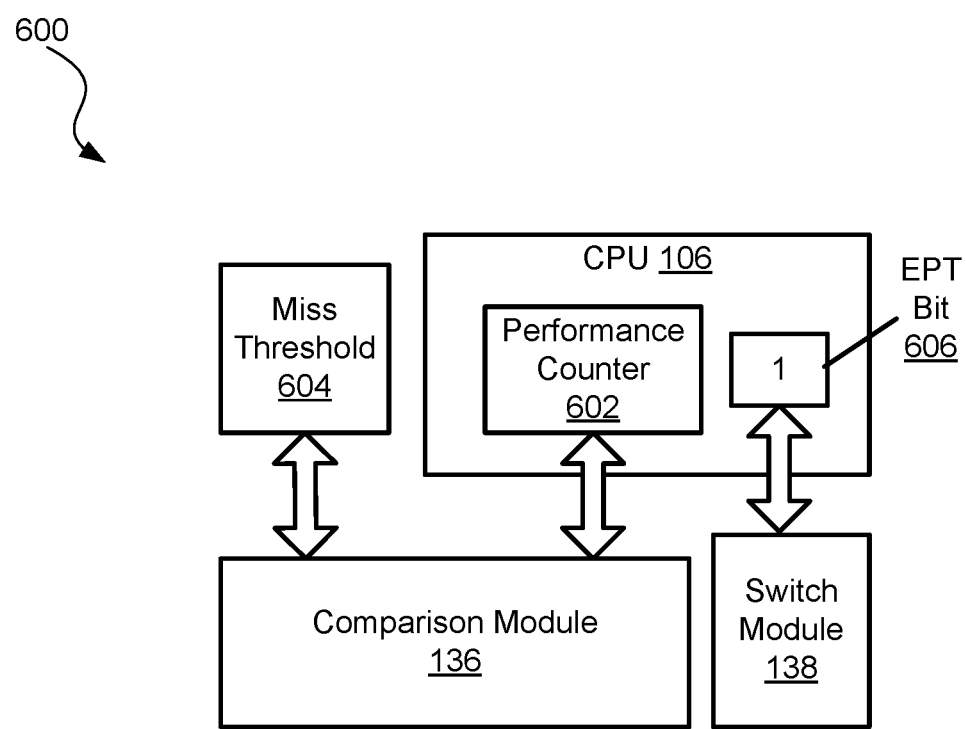
FIG. 6 is a block diagram illustrating a system for switching from the SPT translation mode to the EPT translation mode in accordance with various examples of the present disclosure.

FIG. 6 is a system diagram 600 for switching from the EPT translation mode to the SPT translation mode in accordance with various examples of the present disclosure. In FIG. 6, the comparison module 136 compares a performance counter 602 representing the number of TLB misses to a miss threshold 604. An EPT bit 606 has a value of one, which may indicate that the EPT translation mode is enabled. In an example, if the switch module 138 enables the EPT bit 606, the hypervisor 130 is in the EPT translation mode.

The switch module 132 switches from the EPT translation mode to the SPT translation mode if the number of TLB misses satisfies the miss threshold. The switch module 138 may switch from the EPT translation mode to the SPT translation mode by clearing the EPT bit 606 (e.g., setting the value of the EPT bit 606 to zero). If the comparison module 136 determines that the number of TLB misses satisfies the miss threshold, the comparison module 136 may send a signal to the switch module 132 indicating such information. In response to the indication, the switch module 132 may disable the EPT translation mode. In an example, if the EPT translation mode is disabled, the SPT translation mode is enabled; and if the SPT translation mode is disabled, the EPT translation mode is enabled.

In various implementations, the host machine 102 may include a client or a server computing device. The client or server computing device may include a plurality of CPUs 106 and may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

The computer system includes a bus or other communication mechanism for communicating information data, signals, and information between various components of the computer system. Components include an I/O component that processes a user action, such as selecting keys from a keypad/keyboard, selecting one or more buttons or links, etc., and sends a corresponding signal to the bus. In an example, a user may interact with a host computing system using the I/O component and cause the virtual machine 120 to launch. In this example, the hypervisor may enable the EPT translation mode and eventually switch to the SPT translation mode if certain conditions are met. The I/O component may also include an output component such as a display, and an input control such as a cursor control (such as a keyboard, keypad, mouse, etc.).

A transceiver or network interface transmits and receives signals between the computer system and other devices via a communications link to a network. In an example, the transmission is wireless, although other transmission mediums and methods may also be suitable. The CPU, which may be a micro-controller, digital signal processor (DSP), or other processing component, processes these various signals, such as for display on the computer system or transmission to other devices via the communications link. The CPU may also control transmission of information, such as cookies or IP addresses, to other devices.

Components of the computer system also include a system memory component (e.g., RAM), a static storage component (e.g., ROM), and/or a disk drive. The system memory component may include the memory 108. The computer system performs specific operations by the CPU 106 and other components by executing one or more sequences of instructions contained in the system memory component. Logic may be encoded in a computer-readable medium, which may refer to any medium that participates in providing instructions to the CPU 106 for execution. Such a medium may take many forms, including but not limited to, non-volatile media, volatile media, and transmission media.

In various implementations, non-volatile media includes optical, or magnetic disks, or solid-state drives, volatile media includes dynamic memory, such as the system memory component, and transmission media include coaxial cables, copper wire, and fiber optics, including wires that include the bus. In an example, the logic is encoded in non-transitory computer-readable medium. In an example, transmission media may take the form of acoustic or light waves, such as those generated during radio wave, optical, and infrared data communications. Some common forms of computer-readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various examples, execution of instruction sequences (e.g., method flow 200, method flow 300, method flow 400, and/or method flow 500) to practice the present disclosure may be performed by the computer system. In various other examples, a plurality of computer systems coupled by communication links to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer-readable mediums. It is also contemplated that the application software identified herein may be implemented using one or more general-purpose or specific-purpose computers and/or computer systems, networked and/or otherwise. Where applicable, the ordering of various steps or actions described herein may be changed, combined into composite steps or composite actions, and/or separated into sub-steps or sub-actions to provide features described herein.

The foregoing disclosure is not intended to limit the present disclosure to the precise forms or particular fields of use disclosed. As such, it is contemplated that various examples and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of switching from a first guest virtual address (GVA)-to-host physical address (HPA) translation mode to a second GVA-to-HPA translation mode, comprising:
   comparing, by a hypervisor, a number of translation lookaside buffer (TLB) misses to a miss threshold, the hypervisor being in a first GVA-to-HPA translation mode; and
   switching from the first GVA-to-HPA translation mode to a second GVA-to-HPA translation mode if the number of TLB misses satisfies the miss threshold.

2. The method of claim 1, further comprising:
   comparing an access threshold to a number of modifications to a set of shadow page tables (SPTs) stored in hypervisor memory, the hypervisor being in the second GVA-to-HPA translation mode; and
   switching from the second GVA-to-HPA translation mode to the first GVA-to-HPA translation mode if the number of modifications is greater than the access threshold.

3. The method of claim 1, wherein the first GVA-to-HPA translation mode is an extended page table (EPT) translation mode, and the second GVA-to-HPA translation mode is an SPT translation mode.

4. The method of claim 1, further comprising:
   reading, by the hypervisor, a performance counter to determine the number of TLB misses.

5. The method of claim 1, further comprising:
   loading, by the hypervisor, an EPT pointer, the EPT pointer referencing a base address of a set of EPTs; and
   enabling the first GVA-to-HPA translation mode.

6. The method of claim 5, further comprising:
   setting a preemption timer to a first time period;
   after setting the preemption timer, transferring control of a CPU to a virtual machine, the virtual machine and the hypervisor running on a computing device; and
   after the first time period has elapsed, determining, by the hypervisor, the number of TLB misses.

7. The method of claim 6, further comprising:
   if the number of TLB misses satisfies the miss threshold:

creating a set of SPTs based on a set of guest page tables, the set of SPTs being stored in hypervisor memory, and the set of guest page tables being maintained by a guest running on the virtual machine;

storing the EPT pointer; and disabling the first GVA-to-HPA translation mode.

8. The method of claim 7, further comprising:

after disabling the first GVA-to-HPA translation mode, transferring control of the CPU to the virtual machine;

determining whether a number of accesses to the set of SPTs satisfies an access threshold; and in response to a determination that the number of accesses satisfies the access threshold, flushing the set of SPTs.

9. The method of claim 8, further comprising:

after flushing the set of SPTs, switching from the second GVA-to-HPA translation mode to the first GVA-to-HPA translation mode.

10. A system for switching from a first GVA-to-HPA translation mode to a second GVA-to-HPA translation mode, comprising:

a comparison module that compares a number of TLB misses to a miss threshold, wherein a hypervisor is in a first GVA-to-HPA translation mode; and a switch module that switches from the first GVA-to-HPA translation mode to a second GVA-to-HPA translation mode if the number of TLB misses satisfies the miss threshold.

11. The system of claim 10, wherein the comparison module compares an access threshold to a number of modifications to a set of SPTs stored in hypervisor memory, and wherein the switch module switches from the second GVA-to-HPA translation mode to the first GVA-to-HPA translation mode if the number of modifications is greater than the access threshold.

12. The system of claim 11, wherein the number of modifications is a number of virtual machine exits caused by an attempted access by a guest to access a guest page table.

13. The system of claim 10, wherein the first GVA-to-HPA translation mode is an EPT translation mode that uses a set of EPTs, and the second GVA-to-HPA translation mode is an SPT translation mode that uses the set of SPTs.

14. The system of claim 10, wherein the hypervisor includes the switch module and the comparison module.

15. The system of claim 10, wherein the hypervisor pins a virtual central processing unit (CPU) allocated to a guest to a physical CPU.

16. The system of claim 10, wherein the switch module loads an EPT pointer that references a base address of a set of EPTs to a virtual machine control structure (VMCS) and enables the first GVA-to-HPA translation mode, wherein the comparison module sets a preemption timer to a first time period, transfers control of a CPU to a virtual machine, and determines the number of TLB misses, and wherein the virtual machine and the hypervisor run on a computing device.

17. The system of claim 16, wherein if the number of TLB misses satisfies the miss threshold, the hypervisor creates a set of SPTs based on a set of guest page tables, stores the EPT pointer in a memory, and disables the first GVA-to-HPA translation mode, and wherein the set of SPTs is stored in the hypervisor memory, and the set of guest page tables is maintained by a guest running on the virtual machine.

18. The system of claim 17, wherein after the first GVA-to-HPA translation mode is disabled, the hypervisor transfers control of the CPU to the virtual machine, and wherein the comparison module determines whether a number of accesses to the set of SPTs satisfies an access threshold, and in response to a determination that the number of accesses satisfies the access threshold, the switch module flushes the set of SPTs.

19. A non-transitory machine-readable medium comprising a plurality of machine-readable instructions that when executed by one or more processors is adapted to cause the one or more processors to perform a method comprising:

comparing, by a hypervisor, a number of translation lookaside buffer (TLB) misses to a miss threshold, the hypervisor being in a first GVA-to-HPA translation mode; and switching from the first GVA-to-HPA translation mode to a second GVA-to-HPA translation mode if the number of TLB misses satisfies the miss threshold.

20. The machine-readable medium of claim 19, method further comprising:

comparing an access threshold to a number of modifications to a set of SPTs stored in hypervisor memory; and switching from the second GVA-to-HPA translation mode to the first GVA-to-HPA translation mode if the number of modifications is greater than the access threshold.

* * * * *